United States Patent [19]

Jackson

[11] Patent Number: 5,515,282
[45] Date of Patent: May 7, 1996

[54] METHOD AND APPARATUS FOR IMPLEMENTING A DATABUS VOTER TO SELECT FLIGHT COMMAND SIGNALS FROM ONE OF SEVERAL REDUNDANT ASYNCHRONOUS DIGITAL PRIMARY FLIGHT COMPUTERS

[75] Inventor: Douglas O. Jackson, Mercer Island, Wash.

[73] Assignee: The Boeing Company, Seattle, Wash.

[21] Appl. No.: 233,142

[22] Filed: Apr. 25, 1994

[51] Int. Cl.$^6$ ............................ G06F 15/16; G06F 11/14
[52] U.S. Cl. ................ 364/434; 364/133; 364/184; 371/36
[58] Field of Search ................... 364/434, 556, 364/551.01, 424.06, 133, 184; 371/36; 244/76 R, 175; 395/575

[56] References Cited

U.S. PATENT DOCUMENTS

| | | | |
|---|---|---|---|
| 3,596,107 | 7/1971 | Kittrell | 307/204 |
| 3,783,250 | 1/1974 | Fletcher et al. | 235/153 AE |
| 4,130,241 | 12/1978 | Meredith et al. | 235/307 |
| 4,849,893 | 7/1989 | Page et al. | 364/434 |
| 4,967,347 | 10/1990 | Smith et al. | 364/200 |
| 4,995,040 | 2/1991 | Best et al. | 371/36 |
| 5,278,843 | 1/1994 | Ako | 371/36 |
| 5,297,052 | 3/1994 | McIntyre et al. | 364/453 |

*Primary Examiner*—Michael Zanelli
*Attorney, Agent, or Firm*—James P. Hamley

[57] ABSTRACT

Asynchronous, triple redundant primary flight computers (PFC's) (12, 14, 16) produce output command signals carried over a data bus (18) to control redundant actuators (32, 34, 36) in an aircraft flight control system. To prevent the transmission of a fault and a force fight among the redundant actuators, which drive a common aircraft control surface (50), a databus voter (52, 54, 56) associated with each PFC receives all PFC commands and, in accordance with a selection algorithm, outputs a voted one of the PFC command signals. A databus voter monitor, (144) associated with each databus voter, deactivates its associated databus voter if it detects a voted command signal which is inconsistent with the selection algorithm.

19 Claims, 8 Drawing Sheets

METHOD AND APPARATUS FOR IMPLEMENTING A DATABUS VOTER TO SELECT FLIGHT COMMAND SIGNALS FROM ONE OF SEVERAL REDUNDANT ASYNCHRONOUS DIGITAL PRIMARY FLIGHT COMPUTERS

FIELD OF THE INVENTION

The present invention relates to the digital signal processing art and, in particular to a voter for selecting one of several command signals produced by redundant, asynchronous digital processors.

BACKGROUND OF THE INVENTION

Numerous applications exist in which redundant computers are employed to assure extremely high reliability in operation. One such application is the flight control system on a modern commercial aircraft, such as the Boeing Model 777. Here, a fly-by-wire flight control system replaces the mechanical systems used on other aircraft. The commands for this system are generated by three redundant asynchronous digital Primary Flight Computers (PFC's), which are referred to as channels. Each channel transmits its command output onto a digital databus. The commands on the databus are directed to actuators which in turn move various flight control surfaces. Some flight control surfaces have two or three actuators connected together with each actuator controlled by a different channel. This requires that all channel commands to that surface be identical so that the actuators do not engage in a "force fight". The commands do not naturally track as closely as required because the PFC channels are not synchronized and, as such, will have somewhat different output commands in normal operation.

A PFC command fault of significant magnitude must be removed quickly to avoid unacceptable airplane transients. Fault monitoring may require a significant amount of time to differentiate between an actual fault and normal differences between channels or a transient that will soon disappear. A monitoring system which acts too quickly to detect a fault condition may, therefore, incorrectly and unnecessarily cause a PFC disconnection.

Were redundancy not required for system reliability, an "ideal" control system would utilize a single computer to drive all systems so that there would be no command differences and perfect tracking. An "ideal" monitor for such a system would immediately stop or limit the magnitude of a fault in the event of computer failure, without ever tripping falsely.

One method that has been known to the art to eliminate differences between redundant channel commands is to use timing synchronization techniques to assure that all computations start at the same time and use the same input data and computation sequence in order that all command outputs track. Such a system requires synchronization control between computations. A concern about synchronization is that it may invoke a fault that could propagate errors into all computations and commands, i.e., be generic to the system. A further problem is that the synchronization might fail and therefore another operational mode must be available to continue with failed synchronization.

An additional concern with digital computations in commercial aircraft applications is that designers tend to use commercially available Central Processor Units (CPU) due to their ready availability and versatility. However, commercial CPUs may not have been completely analyzed for all possible operations to determine if some inherent design flaw exists. This could result in an incorrect output command at the same time from all CPUs of one type, making fault detection difficult or impossible since all computations indicate an incorrect result and no comparison with a correct command is possible. The databus voter design avoids this problem since it is simple enough to be analyzed and tested to eliminate such flaws. The databus voter operation is exact and therefore can be easily monitored and disconnected if it fails.

SUMMARY OF THE INVENTION

It is an object of the present invention, therefore, to provide an improved method and apparatus for monitoring the output command signals from redundant computers and selecting one computer's command signals as the voted output command.

In particular, for application in an aircraft flight control system wherein each of a plurality of redundant, asynchronous PFC's produces output commands, and wherein such commands are fed to multiple actuators to control the position of aircraft control surfaces, it is a particular object of the invention to provide a voting system which receives commands from the redundant PFC's and outputs a single, voted command to all interconnected actuators, thereby avoiding a "force fight" situation.

It is a further object of the present invention to provide the above-described voting system wherein a faulted command from a computer is quickly "voted out" to avoid an airplane transient but continues to monitor as long as necessary to determine if an actual fault is present.

It is a further object of the present invention to provide the above-described voting system which provides excellent command tracking without the need for synchronization techniques.

It is yet a further object of the present invention to provide the above-described voter system which is itself completely input/output verifiable such that its operation is exact and can be easily monitored and disconnected if it fails.

It is yet a further object of the present invention to provide a voter monitor system for detecting the occurrence of a failed voting system and providing means to deactivate the voter from continued system control.

In summary, according to one aspect of the invention, a processing system is provided in an aircraft fly-by-wire control system wherein each of a plurality of redundant, asynchronous primary flight computers produces flight command signals and wherein at least one control surface of the aircraft is controlled by a plurality of actuators. The processing system controls the flight command signals which are passed to the actuators and includes a plurality of voters, each voter being associated with a primary flight computer and one or more actuators for receiving the flight command signals from all primary flight computers, and including selection means for acting in accordance with a predetermined selection algorithm to pass a selected one of the flight command signals to the associated actuator.

In an aircraft fly-by-wire control system wherein each of a plurality of redundant, asynchronous primary flight computers produces flight command signals and wherein at least one control surface of the aircraft is controlled by a plurality of actuators, a method for controlling the flight command signals which are passed to the actuators includes the steps of:

a) providing a plurality of voter means, each voter means associated with a primary flight computer and one or more actuators, said voter means performing the steps of:

i) receiving the flight command signals from the primary flight computers, ii) processing the received flight commands through a predetermined selection algorithm and, in accordance therewith iii) passing a selected one of the flight command signals to the associated actuator, whereby all actuators for the control surface receive the same flight command signal.

A parallel, digital processing system comprises a databus, a plurality of digital processing units connected to the databus, with each processing unit receiving data signals over said databus and producing output command signals. The processing units operate in parallel-redundant and asynchronous to the next. A databus voter connects to the databus for receiving the output command signal from each of the processing units. In response to a predetermined voting algorithm, the databus voter outputs onto the databus as the voted command signal a selected one of the received command signals.

A method for implementing a parallel, digital processing system comprises the steps of:

a) providing a databus, b) providing a plurality of digital processing units connected to the databus, each processing unit receiving data signals over the databus and producing output command signals, the processing units operating in parallel and redundant and asynchronous one to the next, and c) providing a databus voter connected to the databus for receiving the output command signals from each of the processing units and, responsive to a selection algorithm, outputting onto the databus as the voted command signal a selected one of the received command signals.

These and other objects of the present invention will become clear from a reading of the specification, in view of the figures, and claims that follow.

DETAILED DESCRIPTION

Figure 1:
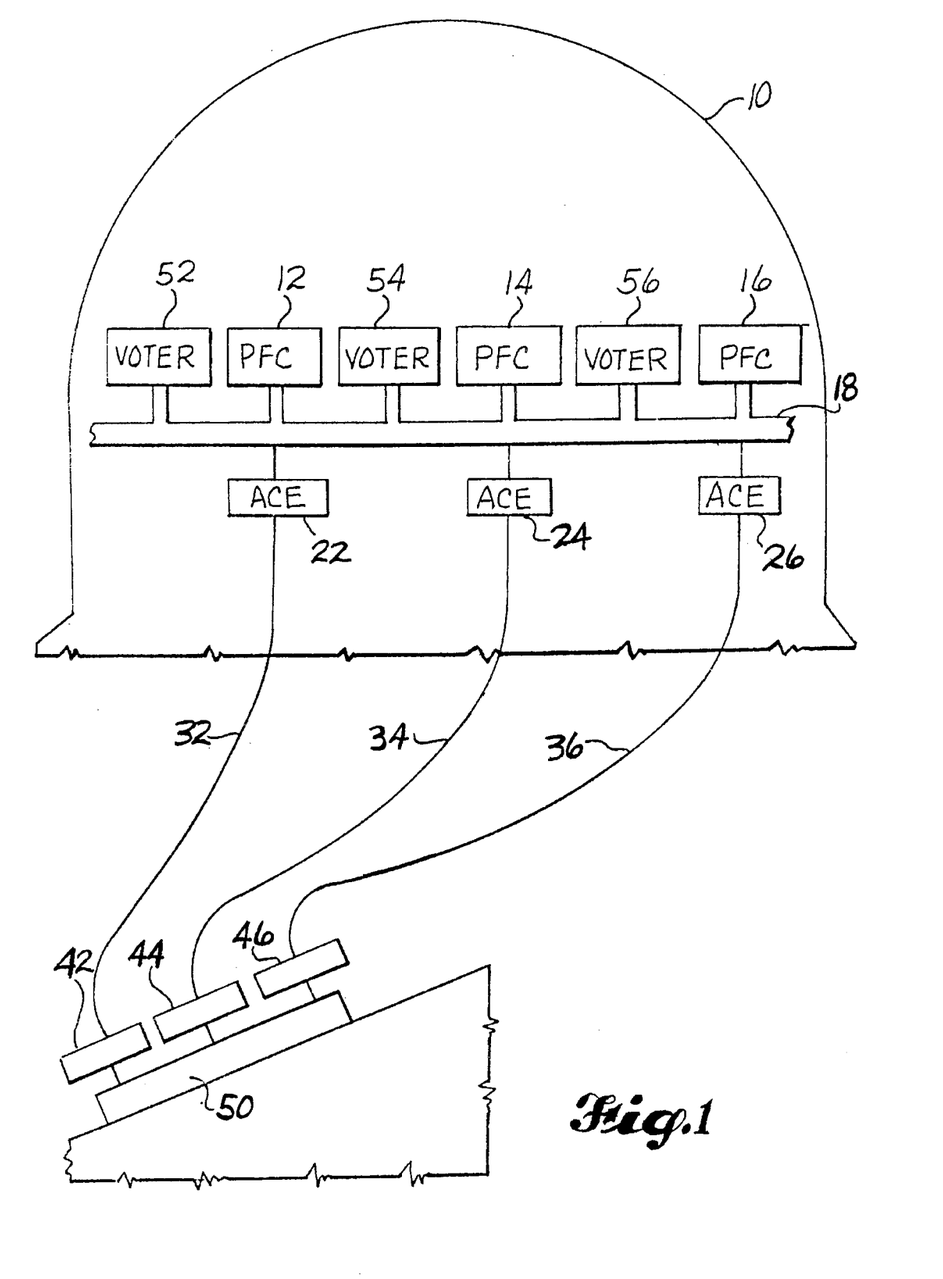
FIG. 1 depicts implementation of the present invention in a fly-by-wire aircraft flight control system and illustrates redundant, asynchronous primary flight computers which connect via a databus to actuator control electronics which, in turn, control multiple actuators connected to an aircraft control surface.

FIG. 1 illustrates the preferred embodiment of the invention for use in an aircraft flight control system. Shown in general outline is an aircraft 10. Triple redundant, asynchronous Primary Flight Computers (PFC's) 12, 14 and 16 are provided, normally in the electronics bay of the aircraft. Each of the primary flight computers 12, 14 and 16 receives digital data over a digital databus 18. Such data, in the normal manner, includes information as to the present condition of the flight of the aircraft and intended flight changes. This data is processed by each of the primary flight computers 12, 14 and 16 which, in turn, produces output digital command signals on the databus 18.

Since the embodiment shown in FIG. 1 is of the fly-by-wire type, the output digital commands from the PFC's 12, 14 and 16 are passed to corresponding Actuator Control Electronics (ACE) 22, 24 and 26, respectively. Each of the ACE's, also normally located in the electronics bay of the aircraft, converts the digital command signals it receives into a suitable analog command which is coupled over wires 32, 34 and 36, respectively, to actuators, such as actuators 42, 44, and 46, respectively.

Each of the actuators 42, 44 and 46 connect to a common aircraft control surface, here illustrated as an aileron 50.

It should be understood that, for purposes of clarity, numerous other aircraft control surfaces, such as spoilers, flaperons on both wing surfaces, as well as the elevators and rudder in the tail section would be similarly controlled by the PFC's 12, 14 and 16.

Absent implementation of the present invention, the system of FIG. 1 would operate as follows. In response to data signals over databus 18, each of the PFC's 12, 14 and 16 would output redundant flight command signals. Since the PFC's are not operating in a synchronized mode, these output command signals would necessarily be asynchronous one to the next. Each of the corresponding ACE's 22, 24 and 26 would in turn convert its corresponding PFC produced command signal to a signal suitable for coupling via wires 32, 34 and 36 to the actuators 42, 44 and 46, respectively. In turn, each actuator would attempt to control the aileron 50 to the commanded position.

However, since the command signals do not track each other as a result of their asynchronous operation, the various actuators 42, 44 and 46 would receive somewhat different command signals in normal operation. As such, the actuators 42, 44 and 46 would engage in an undesirable "force fight" in their attempt to position aileron 50.

One possible solution to the aforestated problem would be the use of synchronization circuitry to force all of the PFC's 12, 14 and 16 to operate in a synchronized manner. Such synchronization schemes, however, have the undesirable effect of making all three PFC's 12, 14 and 16 susceptible to failures that could propagate to all PFC 12, 14 and 16 channels.

Figure 5A:
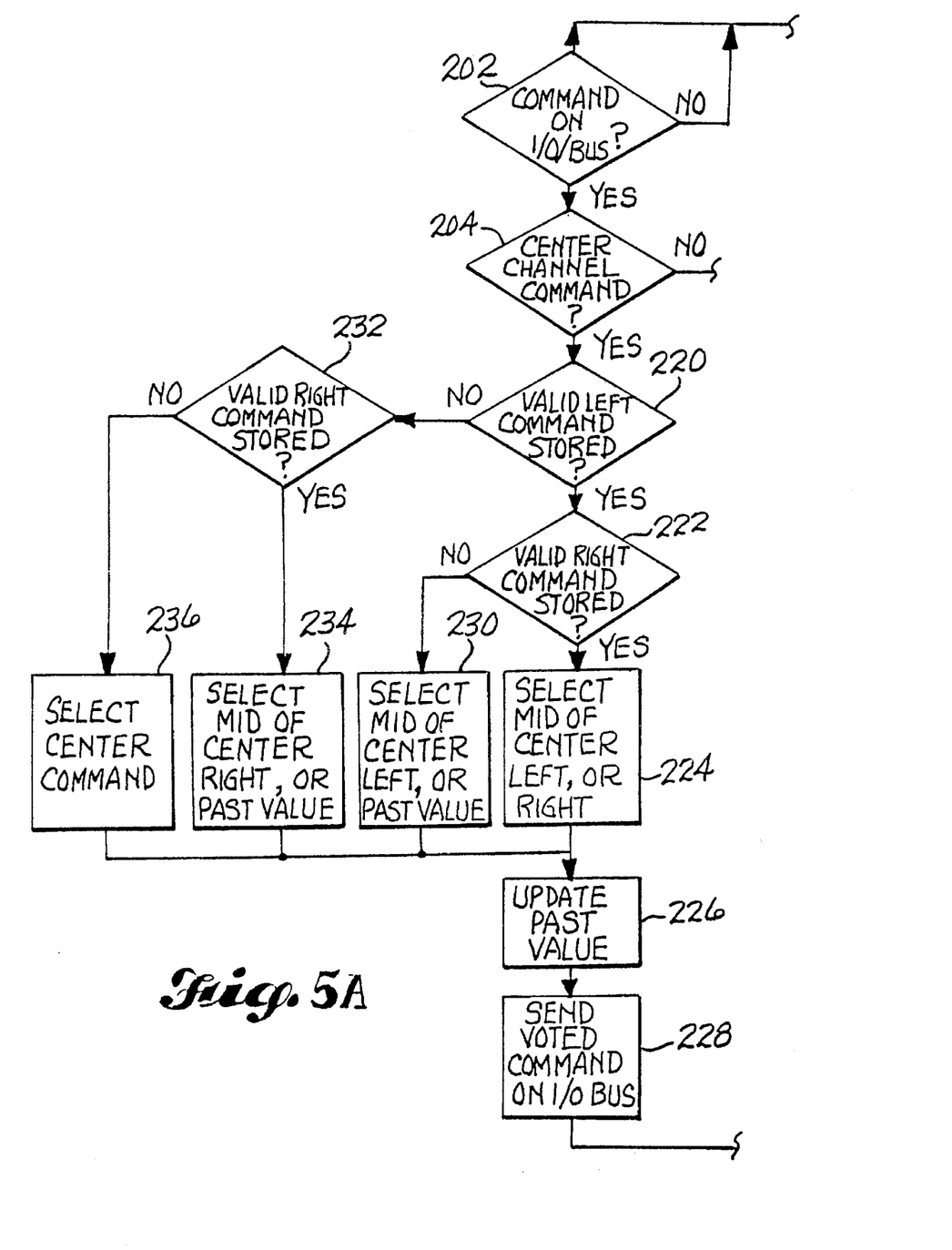
FIGS. 5A and 5B are a logic flow diagram illustrating sequential steps performed by the databus voter to implement the selection algorithm.
Figure 5B:
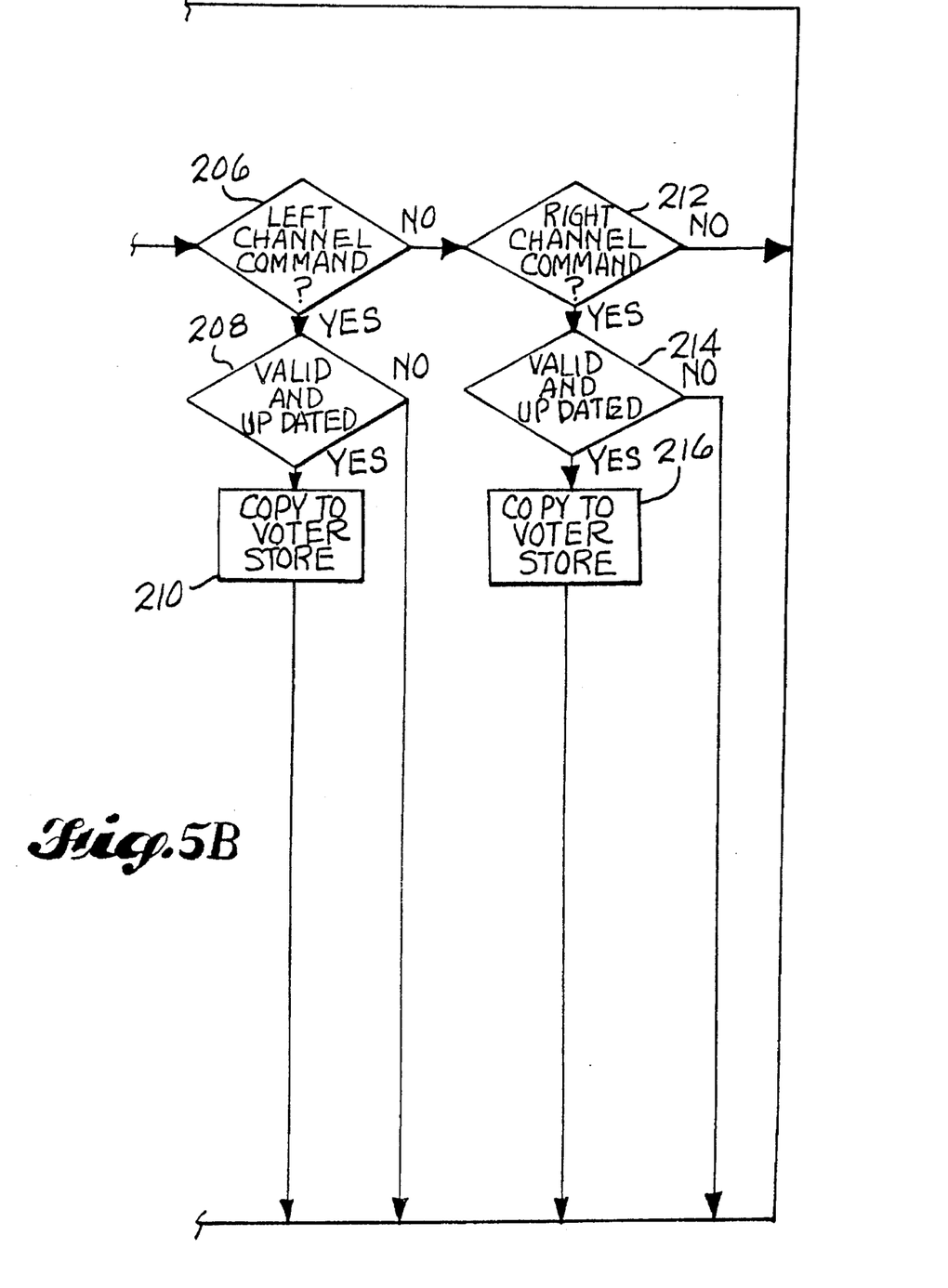

In accordance with the present invention, a plurality of databus voters 52, 54 and 56, each associated with one of the PFC's 12, 14 and 16 respectively, and a corresponding ACE 22, 24 and 26 respectively are employed. The voters 52, 54 and 56, monitor the command signals produced by all of the PFC's 12, 14 and 16 and, utilizing a selection algorithm described in detail with respect to FIG. 5, select one of the PFC command signals as the voted output. It is this voted output command signal which is passed through each ACE 22, 24 and 26 to its corresponding actuator 42, 44 and 46. Since each of the voters 52, 54 and 56 receives the same command input signals and implements the same selection algorithm, then each of the ACE's 22, 24 and 26 should receive the same voted command signal, whereby each of the actuators 42, 44 and 46 receives identical commands. In this way, a "force fight" among the various actuators is avoided.

As will be understood more fully with respect to the detailed discussion hereinbelow, each of the voters 52, 54 and 56 analyses the commands produced by their associated PFC's 12, 14 and 16 independently of the processing of the PFC's. In this way, a fault in a PFC is not also generic to a voter, and, as such the voter is capable of detecting all PFC fault conditions.

In addition, as will be understood more fully after a review of the detailed discussion hereinbelow, the voters 52, 54 and 56 and the voter monitors are simple enough that they can be implemented using designs which can be analyzed and tested for all functions. This is unlike the central processing units (CPUs) which are often employed for commercial applications and may not have all possible input/output functions clearly tested and defined. This is significant because it avoids the possibility of a generic fault in all the voters at the same time that could result in a faulty command output from all of the PFC's or a generic fault in all the monitors that could result in shutting down all PFC's at the same time. In a flight control system according to the present invention, however, the voters 52, 54, and 56 and monitors are not susceptible to such generic faults.

Figure 2:
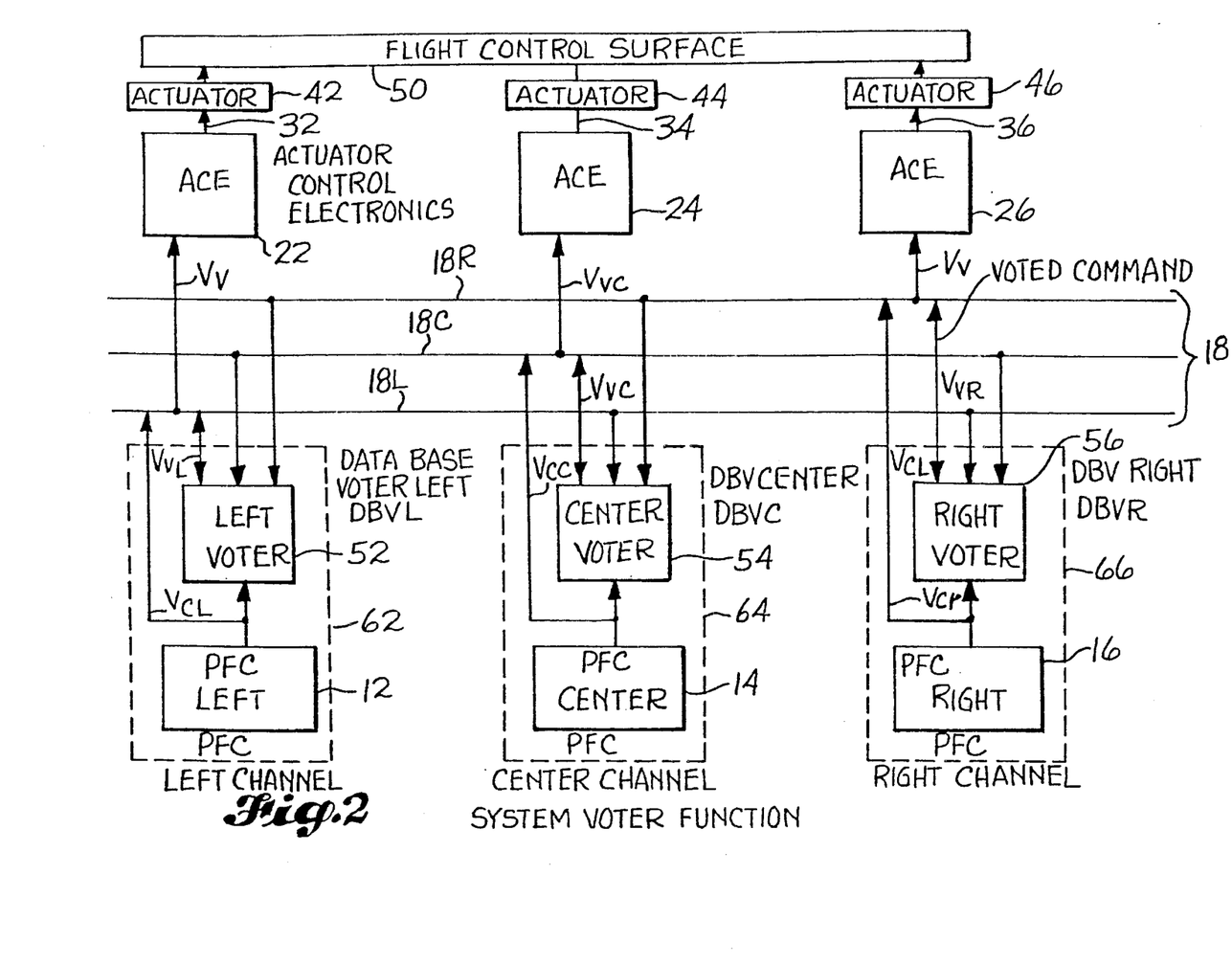
FIG. 2 is a block diagram illustrating a triple redundant channel control system, employing the inventive voting system, which connects through digital databuses to control actuator control electronics and, thereby, actuators and the flight control surface.

In addition, as will be more fully understood hereinbelow, the voters 52, 54 and 56 include voter monitors which compare the voted command signals with the possible voted command signals as determined by the selection algorithm. In the event that a voted command signal is inconsistent with a selection algorithm, the voter monitor indicates the fault condition and the failed voter can be deactivated. The PFC's include logic to associate an ACE whose associated voter has failed with another, activated voter to assure continued, reliable operation of the flight control system. FIG. 2 is a more detailed block diagram illustrating the principle components of the flight control system utilizing the inventive databus voter system.

Here, as with FIG. 1, a series of three, triple redundant, asynchronous PFC's 12, 14 and 16 generate redundant, asynchronous flight command signals. For reference purposes, these are designated left, center and right, respectively. Each command signal from the PFC's 12, 14 and 16 is coupled to one of three buses 18L, 18C and 18R respectively on the collective databus 18. Associated with each of the PFC's 12, 14 and 16 are ACE's 22, 24 and 26, respectively. Each ACE 22, 24 and 26 receives its input command signal from its corresponding one of the databuses 18L, 18C and 18R.

Each ACE 22, 24 and 26 operates to convert a digital command signal received at its input into an analog signal suitable for coupling over lines 32, 34 and 36, respectively to actuators 42, 44 and 46 respectively. All of the actuators drive a common flight control surface 50 into position.

While the triple redundancy afforded by the design of FIG. 2 offers high system reliability, it presents a problem. Since the PFC's 12, 14 and 16 operate asynchronously, the command signals applied through their associated ACE's 22, 24 and 26 will likely differ somewhat, whereby the actuators 42, 44 and 46 will engage in a force fight to control the position of the flight control surface 50.

Such a force fight is avoided, while preserving the independence of each PFC command, by providing a left voter 52, center voter 54 and a right voter 56. For purposes of convenience, the left voter 52 and left PFC are designated the left channel 62 the center PFC 14 and center voter 54 are designated the center channel 64 and the right PFC 16 and right voter 56 are designated the right channel 66.

Operation of all three channels 62, 64 and 66 will be understood by way of example with the description of the operation of the center channel 64.

The output from the center PFC $V_{cc}$ is passed to the center databus 18C. The same command signal $V_{cc}$ is passed as an input to the center voter 54. Also provided as an input to center voter 54 are the signals appearing on each of the databus lines 18L, 18C and 18R. Thus, center voter 54 receives as inputs left PFC, designated $V_{cl}$ and the command signal out of the right PFC signal 16, designated Vcr.

Center voter 54, in accordance with a predetermined voting algorithm which is described in detail with respect to FIG. 5, selects one of the input command signals and outputs the selected signal as a voted center command signal $V_{vc}$ on the databus 18C. Similarly, left voter 52 outputs the voted command signal $V_{vl}$ on the databus 18L, while the right voter 56 outputs the right voted command $V_{vr}$ onto databus 18R. It is now the voted command signals $V_v$ which are passed to the ACE's 22, 24 and 26 which, through the actuators 42, 44 and 46 control the position of the flight control surface 50. Since each of the voters 52, 54 and 56 are all operating on the same command signals and implement the same selection algorithm, then the voted command signals $V_v$ applied to all of the ACE's 22, 24 and 26 are the same or approximately the same signal. As such, the actuators will all act in unison and a "force fight" is avoided.

Figure 3:
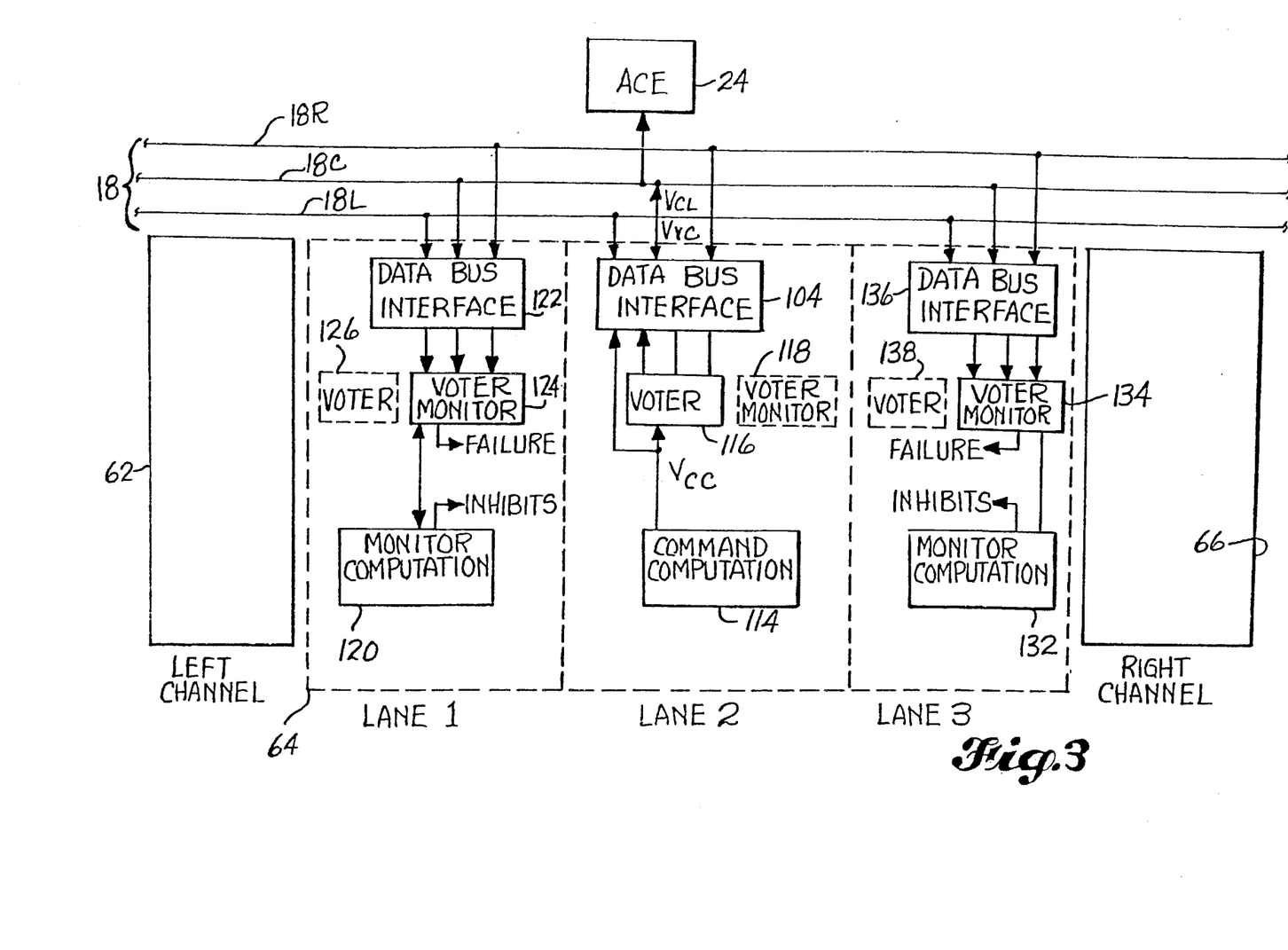
FIG. 3 is a detailed block diagram illustrating the principle functional blocks of the center channel of a three channel control system.

FIG. 3 is a more detailed block diagram illustrating the preferred implementation of one of the channels shown in FIG. 2.

More specifically, shown as blocks are the left and right channels 62, 66 and in detail is the center channel 64. The center channel is now broken into three "lanes", lane 1, lane 2 and lane 3 as shown. The lanes all connect via databus interface circuitry 122, 104 and 136 to the databuses 18L, 18C and 18R. Also shown is the ACE 24 which is associated with the center channel bus 18C and center channel 64.

Each of the lanes in FIG. 3 performs a computation. In the example shown, lane 2 includes the PFC command computation function 114. The command computation signal $V_{cc}$ is passed to an associated, activated voter 116, to the databus interface 104 for application over the center databus 18C.

The activated voter 116 also receives the command computations from the left channel over databus 18L and the right channel over databus 18R. In response to its programmed selection algorithm (described in detail with respect to FIG. 5), activated voter 116 outputs a selected one of the command signals as a voted command $V_{vc}$ on the center databus 18C for application to the ACE 24. Lane 2 also includes a voter monitor 118 which, as will be understood with respect to the discussion below, is in the inactive mode since lane 2 is chosen as the current command lane.

Since computation lanes 1 and 3 are not chosen as the active computation lane, they perform a monitoring function. Lane 1 includes a voter monitor 124 which receives all of the command signals on the databuses 18L, 18C and 18R via the databus interface 122. Lane 3 includes a voter monitor 134 which receives all of the command signals on databus 18L, 18C and 18R through its interface 136. Lane 1 includes a currently inactive voter 126 whereas lane 3 includes currently inactive voter 138.

In operation, the monitor computation blocks 120, 132 compare the command signal $V_{cc}$ produced by PFC command computation 114 with those current and prior data commands received by their respective voter monitors 124, 134. The monitor computation blocks 120, 132 calculate the possible voted command signals $V_{vc}$ which could be selected by voter 116 based upon those existing and prior command signals appearing on the databus 18. If the voted command signal $V_{vc}$ is inconsistent with the selection algorithm, then a failure, or fault detect signal is produced by the voter monitors 124, 134 and an inhibit signal by the monitor computation blocks 120, 132. The system will then operate to deactivate voter 116 and associate the PFC command computation 114 with an active voter, (i.e. voter 126 or 138) in one of the other lanes.

In this way, each channel of the flight control system has a means to detect the failure of its command voter, inactivate the command voter and switch to another, activated voter.

Figure 4:
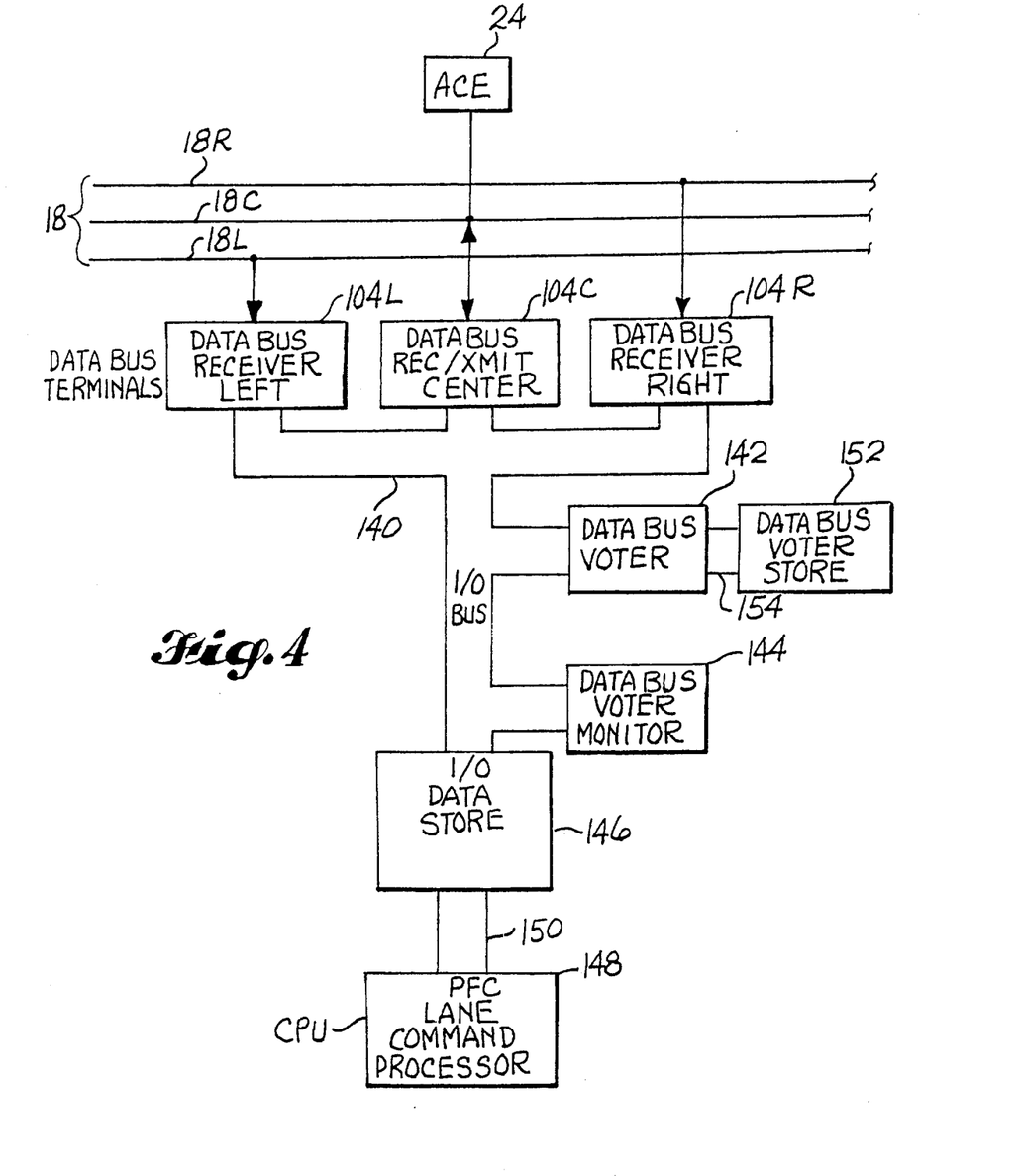
FIG. 4 is a detailed block diagram illustrating implementation of one of the channel lanes.

FIG. 4 is a yet more detailed block diagram illustrating the principle components of the command lane, lane 2, as shown in FIG. 3. As shown, digital data on the left databus 18L is received via a databus receiver left 104L. Digital data on the right digital databus 18R is received over a databus right receiver 104R. Data may be received on, or transmitted to the center digital databus 18C over a databus REC/XMIT interface block 104C. The received data is coupled onto an input/output bus 140. Connected to the input/output bus 140 is the databus voter functional block 142, the databus voter monitor functional block 144 and the I/O data store block 146. A PFC lane command processor 148 accesses and inputs to the I/O data store and addressing function block 146 over a databus 150. In addition, the databus voter functional block 142 writes data to, and reads data from a databus voter store functional block 152 over a databus 154.

The three databuses 18L, 18C and 18R provide data connections for each lane of the primary flight control computer to other components of the flight control system including other lanes and channels of the PFC. The data occurs on the databuses 18L, 18C and 18R as periodic word stream group transmissions in a repeating sequence. The lane shown in FIG. 4 is able to receive on all three buses, but can only transmit on the center bus, 18C. This is done to minimize the possibility of a lane fault causing a bus problem on more than one bus.

Appearing on the digital databuses 18L, 18C and 18R are the input data from other electronic units on the aircraft, such as air data, inertial reference information, sensor information, such as pilot control position or actuator position, as well as the command outputs from other channels, and cross channel mode and equalization information. The lane command processor 148 uses this information to compute its output command signals which are transmitted through the databus REC/XMIT center block 104C over the center digital databus 18C.

The databus receive terminals 104L, 104C and 104R periodically receive word strings from the databuses 18L, 18C and 18R that are intended for use by that terminal. The terminal breaks down the word strings into separate data words and associates each word with an assigned address depending on the use. The terminal then gains access via I/O bus 140 and transmits an address and associated data word on the I/O bus 140 to the I/O data store and addressing functional block 146. This process continues until all of the data from the word string is transferred to the I/O data store and functional block 146.

Databus REC/XMIT block 104C is capable of operation in the reverse direction from the receive terminals. Here, the transmit portion of databus REC/XMIT terminal 104C calls out data words from the I/O store 146 by use of the assigned address for each word. The databus REC/XMIT terminal 104C then transmits these data words as part of a labeled word string on the databus 18C.

In this, the preferred embodiment of the invention, the databus terminals 104 are comprised of ARINC 629 type, DATAC terminals. Descriptions of such terminals can be found in the following U.S. Pat. Nos., all assigned to The Boeing Company:

4,471,481

4,199,663

4,825,450

4,823,364

The I/O data store and addressing functional block 146 contains all the data that is received on all three databuses 18L, 18C and 18R or is ready for transmission to bus 18C via the databus REC/XMIT terminal 104C. The I/O data store and addressing functional block 146 received data is used by the PFC lane processor 148 for its operation but is limited to using data for which the updating process from the data bus 18C is complete. This prevents accessing data which is in the process of being updated and which would result in the receipt of partially old data and partially new data mixed together. A similar process occurs for transmission of the data through the databus REC/XMIT terminal 104C to the databus 18C. The transmitting operation of databus REC/XMIT terminal 104C is not allowed to use data that is in the process of being updated by the PFC lane command processor 148—it will only use data which has been completely updated. This process allows the terminals 104L, 104C, and 104R to be receiving and transmitting data asynchronously with other operations of the I/O data store and addressing functional block 146 and PFC lane command processor 148.

The PFC lane command processor 148 retrieves received data from the I/O data store and addressing functional block 146 over the databus 150 by using the address corresponding to the requested data. The PFC lane command processor 148 downloads the data stored in the I/O data store and addressing functional block 146 when such data has been fully updated. The PFC lane command processor 148 then uses this data and other data stored in the I/O data store and addressing block 146 to compute the next set of flight control command outputs. The PFC lane command processor 148, after completing the update of its next set of command outputs, then uploads the command data to the I/O data store and addressing functional block 146 by sending the address and data for each data word that is to be uploaded. When the transmit portion of the databus REC/XMIT terminal 104C is ready to transmit, it retrieves this data over databus 140 from the I/O data store and addressing functional block 146 and sends it out over the databus 18C.

The databus voter 142 is designed to operate independently of, and not under the control of the PFC lane command processor 148, I/O data store and addressing functional block 146 or other functions so that its operation cannot be unknowingly corrupted by faults in these other functions. Note that the databus voter 142 does not access the I/O data store and addressing functional block 146 to receive its data. Rather, the databus voter 142 monitors the addresses on the I/O bus 140 as passed by the terminals 140L, 140C and 140R. These addresses are used for sending data to or from the I/O data store and addressing functional block 146 when the terminals receive or transmit I/O on the databus 18.

When the databus terminals 104L, 104c and 104R receive the commands from the other PFC channels, this information is routed via the receivers 104L, 104C and 104R to the I/O bus 140. The databus voter 142 detects the address for these channel commands, and copies and stores the data to its associated data base voter store 152 without effecting the operation of the I/O bus 140.

When the databus voter 142 detects an output command from its own, associated PFC lane command processor 148, it copies the command to its databus voter store 152 and uses it with the other channel commands previously stored in databus voter store 152 to produce the voted command signal. The databus voter then places the voted command signal on the I/O bus 140 when the address that corresponds to voted commands occurs. The channel command and the channel voted command are both transmitted on the databus 18C via the databus REC/XMIT terminal 104C. The channel voter command is used for controlling the actuators, whereas the channel command is used by the other channels to produce their own voted commands.

The databus voter monitor 144 is an independent device that checks for proper operation of the databus voter 142 to assure that the correct voted commands are actually routed to the databus 18C. This is accomplished by using the command signals and voted command words on all of the databuses as they are received by the databus terminals 104L, 104C and 104R and appear over the I/O databus 140. The databus voter monitor 144 continuously checks the I/O bus 140 for the address of a channel command word. When it finds this address it copies the command word and associated voted command word. The voter databus voter monitor 144 then uses the I/O bus 140 to obtain from the I/O data store and addressing functional block 146 the command output from other channels that could have been used by the databus voter 142 to compute the voted command.

The databus voter monitor 144 cannot always determine a single correct value for voted command comparison because of the asynchronous timing of the databuses 18L, 18C and 18R databus voter operation and the command computation. The databus voter may have computed the voted value from the most recent or from the previous commands depending upon how long ago the voted command was calculated. The databus voter monitor 144 computes several possible voted commands using combinations of the commands from other channels for comparison. Most of the time, only one voted command value is correct because one command is always the midvalue. In other cases, the possibilities can be reduced by eliminating the next to highest or next to lowest value if they are from the same channel. Otherwise, there will be several possible results. If the databus voter 142 voted output command is inconsistent from the possible output as determined by the databus voter monitor 144 application of the selection algorithm to the possible command signals, the databus voter monitor 144 causes the channel to shift to a different databus voter and command computation.

Thus, operation of the databus voter 142 in FIG. 4 begins with a command lane in a channel computing a command output word such as aileron position. This command data word is placed in the I/O data store and addressing functional block 146 at an address used for the latest update of aileron command. When the databus REC/XMIT transmit terminal is ready to transmit the command word for the aileron, it places the proper address onto the I/O bus 140 to access the aileron command word. The aileron command word then appears on the I/O bus 140 for transmission to the databus REC/XMIT terminal 104C. The databus voter 142 recognizes the address for the aileron command as one of the commands it requires for its selection algorithm and copies the aileron command word from the I/O bus and stores it in the databus voter store 152 for use in the vote computation. The databus voter 142 had previously stored aileron command words from the other channels that it had copied off of the I/O bus 140 via the databus receiver terminals 104L and 104R. The databus voter 142 now has the data required to exercise the selection algorithm (i.e. vote) on the aileron command signals. In accordance with its selection algorithm, it produces a voted output using the command from the other two channels and its own channel to produce a voted aileron command. The voted aileron command is placed onto the I/O bus 140 as the next word for transmission by the databus REC/XMIT terminal 104C to the databus 18C. This process continues with the next command in the word string followed by a voted command followed by another command, and continues to repeat until all the commands for the word string are complete. This word string is then transmitted via the databus REC/XMIT terminal 104C to the other channels and to the ACE 44. The ACE 44 uses the voted command to position the associated actuator (not shown). The other channels use their own command output and each other's command to generate their own voted command signals. The other channels check that the voted command is correct by utilization of databus voter monitors, such as databus voter monitor 144.

In a typical aircraft control surface installation, three actuators might be used to control surface position. Each actuator would be controlled by a different ACE, such as ACE 44 commanded by different channels (left, center and right). Use of the inventive databus voter, such as databus voter 142, allows each of the channels to have somewhat different commands due to normal computation time skew differences and tolerances, but to supply a voted command to each of the ACE's that are very nearly the same from all channels. This allows the three actuators on the aircraft control surface to be commanded to the same position and thereby avoid a conflict or "force fight" between them that might occur if each was controlled independently from each channel. Moreover, a fault by a PFC is "voted out" thereby avoiding passing an erroneous signal.

FIG. 5 is a flow diagram illustrating the preferred selection algorithm used by the databus voter 142 of FIG. 4. While the selection algorithm set forth in FIG. 5 is for a specific center channel databus voter, it should be understood that parallel, similar selection algorithms are executed by the system's other databus voters.

At decision block 202 the voter determines whether or not a command signal appears on I/O bus 140. If no command has been received, the databus voter cycles back to look for a command on I/O bus 140.

If a command signal does appear on I/O bus 140, the databus voter 142 enters decision block 204 and it determines whether or not the command signal has been generated by its associated PFC lane command processor 148. If the command signal is determined to not be from the associated PFC lane command processor 148, decision block 206 is entered and the databus voter 142 determines whether or not the command signal is from the left channel. If the command signal is from the left channel, databus voter 142 enters decision block 208 and determines whether or not the command signal is both valid and updating. That is, the data word received will indicate whether or not the word is valid and has been recently updated. If the command is not valid or has not been recently updated, decision block 208 returns to looking for a command on the databus at decision block 202. If, however, the word is valid and updated, decision block 208 sends the left channel command signal to the databus voter store 152 at block 210.

If, however, at decision block 206 it is decided that the command signal is not from the left channel, a decision block 212 is entered wherein it is determined whether or not the signal is from the right channel. If the command signal is not from the right channel then this means that none of the left, right or center channels commands are valid and the system cycles back to decision block 202. If, however, the command is from the right channel, decision block 214 is entered to determine whether or not the signal is valid and recently updated. If it is not valid, or has not been recently updated, decision block 214 returns to block 202 to command on the I/O bus. If, however, the decision block 214 determines that the valid right channel command has been recently updated, the command is copied to the voter store 152 at block 216.

Returning to decision block 204, if databus voter 122 determines that the command is valid and recently updated center channel command it enters decision block 220. In decision block 220, the databus voter 142 determines whether a valid left command signal has been previously stored.

If decision block 220 determines that a valid left command has been previously stored, decision block 222 is entered to determine if a valid right command has been previously stored. If a valid right command has been previously stored, the databus voter 142 enters block 224 which dictates that it select the midvalue of the center channel command, the left channel command or the right channel command. The selected (i.e. "voted") command signal is sent to block 226 to update the past voted command with a new voted command signal. This voted command signal is then sent at block 228 over the I/O databus 140, and the system returns to decision block 202 to await further input commands.

If, however, at decision block 222 it is determined that a valid right command signal has not been previously stored, the selection algorithm at block 230 is entered. Here, the selection algorithm dictates the selection of the midvalue of the center channel, left channel or the past value stored for the right channel. This voted command is then sent to block 226 to update the past value of the voted command.

Returning again to decision block 220, if the decision determines that a valid left command value has not been stored, decision block 232 is entered. Here, databus voter 142 determines whether or not a valid right command signal has been stored. If a valid right command signal has been stored, the selection algorithm in block 234 dictates that the midvalue of the center channel command, right value command, or the past stored value for the left channel command be selected as the voted command signal. This voted command signal is then sent to block 226 to update the past value for the voter command signal.

Finally, if the decision out of decision block 232 is that a valid right command signal has not been stored, the selection algorithm in box 236 selects as the voted command the center channel command signal, which is in turn passed to block 226 to update the past voted command signal.

Operation of the databus voter 142 with respect to the selection algorithm set forth in FIG. 5 can operate on either data word strings or on discrete bit by bit variable words. Thus, if data word strings were used the databus voter, if it has received three valid and updated commands to use, will pick the middle value for use as the voted command. If the databus voter has only two valid and updated commands for use, and the data words are continuous variables, the databus voter uses the voted output from the last time it voted as the third input to the middle value selection. If the databus voter has only its own lane valid and updated command available, it will update that as the voted command. If the databus voter does not have a valid and updated command from its own lane, it will not output a command.

If the databus voter is operating on discrete bit by bit variable data words, and if it has three valid and updated commands to use, the databus voter will select the majority of the three bits at each position in the words as the bit for bit command output. If the databus voter has only two valid and updated commands to use, it will examine the two bits at each position and if they agree, the voted output will be the same at that bit position. If the bits disagree a default will be used at that bit position. If the databus voter has only its own lane valid and updated command available, it will output that as the vote command. If the databus voter does not have a valid and updated command from its own lane, it will not output a command.

Figure 6A:
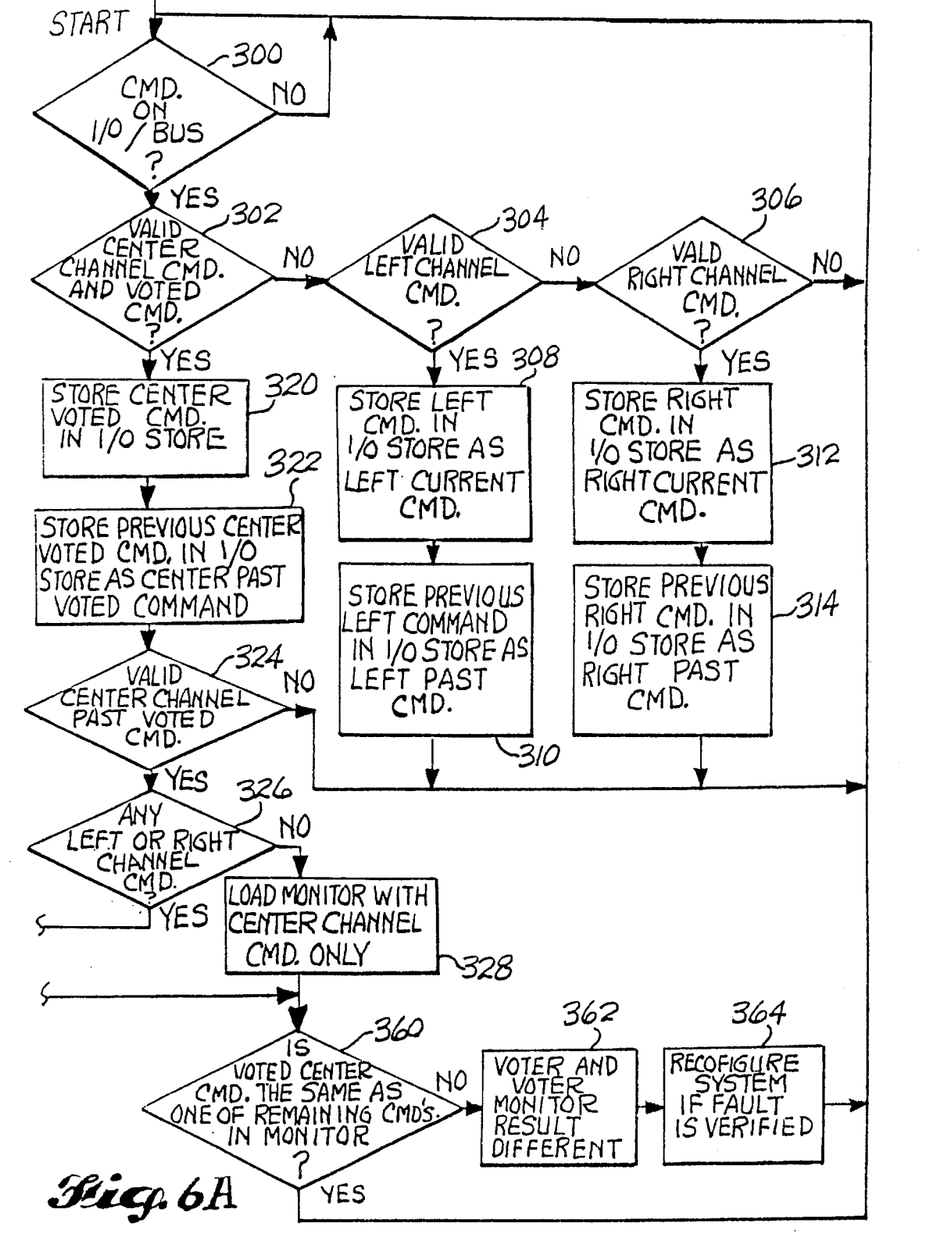
FIGS. 6A and 6B are a logic flow diagram illustrating operation of the databus voter monitor.
Figure 6B:
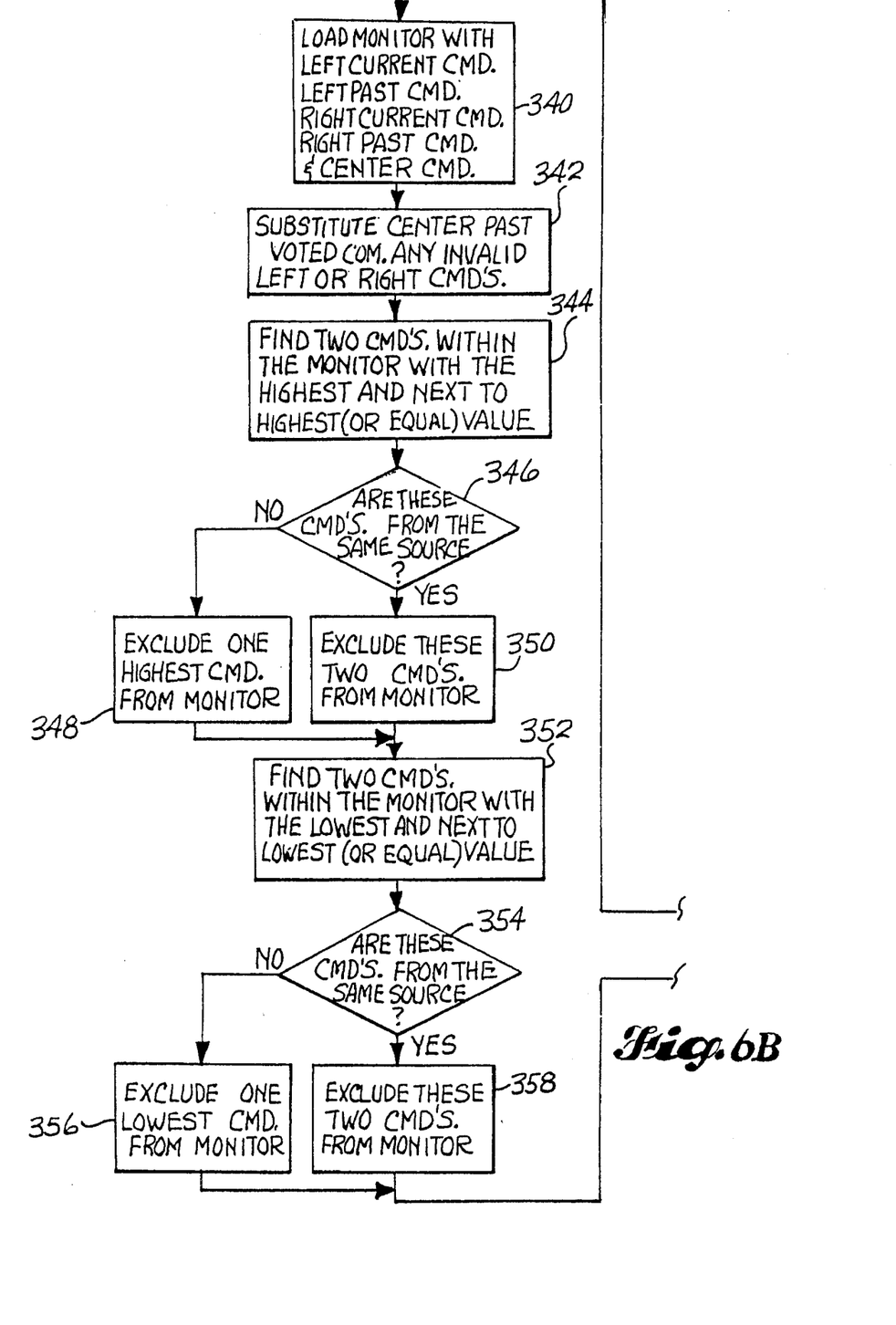

FIG. 6 is a logic flow diagram illustrating operation of the databus voter monitor 144 FIG. 4. While FIG. 6 is directed to operation of databus voter monitor 144, it should be understood that all of the other databus voter monitors in the processing system operate in a similar manner.

At block 300, the databus voter monitors the I/O bus to determine if a command appears thereon. This sequence continues until a command has been received on the I/O bus, at which point, at block 302, the databus voter determines whether a valid center channel command and a voted command appears on the I/O bus. If a valid center channel command and voted command is not on the I/O bus, block 304 is entered, at which point it is determined whether or not a valid left channel command appears on the I/O bus. If no such command appears on the bus, block 306 is entered to determine whether or not a valid right channel command appears on the bus. If no such valid command is on the I/O bus, the databus voter returns to await a command on the I/O bus at functional block 300.

If, at block 304, it is determined that a valid left channel command has been received, block 308 is entered, at which point the valid left channel command is stored in the I/O data store and addressing block as the current left channel command. In block 310, the previous left channel command is stored in the I/O data store functional block as the left past command. The system then returns to block 300, awaiting a further command on the I/O bus.

If, at block 306, it is determined that a valid right channel command appears on the I/O bus, at block 312 this right channel command is stored in the I/O data store and addressing functional block as the right current command. Further, at block 314, the previous right channel command is stored in the I/O data store and addressing block as the right past command. The databus voter monitor then returns to functional block, 300 awaiting an additional command on the I/O bus. Returning to functional block 302, if it is determined that a valid center channel command and voter command appear on the I/O bus, block 320 is entered and the center voted command is stored in the I/O data store and addressing block. Further, at block 322, the previous center voted command is stored in the I/O data store and addressing functional block as the center past voted command.

The databus voter monitor then determines, at block 324, whether or not a valid center channel past voted command exists. If no such command exists, the databus voter monitor returns to functional block 300 awaiting a command on the I/O bus. If a valid centered channel past voted command does exist, block 326 is entered and the system determines whether any valid left or right channel command has been received.

If it is determined that a valid left or right channel command has been received, block 340 is entered. Here, the monitor is loaded with the left current command, the left past command, the right current command, the right past command and the center command. Then, at block 342, the center past voted command is substituted for any invalid left or right commands. At block 344, those two commands within the monitor having the highest and next to highest (or equal) values are identified. At logic block 346, a determination is made as to whether or not these commands were from the same source. If they were not, at block 348 the system excludes one of the highest commands from the monitor. If, however, out of block 346 it is decided that the commands are from the same source, block 350 is entered and both of the commands are excluded from the monitor.

Following either block 348 or block 350, the databus voter monitor, at block 352, finds the two commands within the monitor having the lowest and next to lowest (or equal) value. The decision is then made at block 354 as to whether these two lowest commands are from the same source. If they are not, then at block 356 the lowest command is excluded from the monitor. However, if at logic block 354 it is determined that the commands are from the same source, block 358 is entered and both commands are excluded from the monitor. The step following either block 356 or block 358 is block 360 wherein a determination is made as to whether the voted center command is the same as one of the remaining commands in the monitor.

Returning to logic block 326, if no valid left or right channel command has been received, block 328 is entered and the databus voter monitor loads as its only command the center channel command signal. The system then determines, at block 360, whether the voted center channel is the same as one of the remaining commands in the monitor. If it is the same, that means that the output from the databus voter is a valid value (i.e., the voted command is an appropriate value) whereby the system returns to block 300 to receive further commands on the I/O bus. If, however, at block 360 it is determined that the voted center channel command is not the same as one of the remaining commands stored in the monitor, the conclusion is made at block 362 that the voter and voter monitor result are different whereby, at block 364, the databus voter monitor implements the function of reconfiguring the system if the fault is verified. Thus, the databus voter monitor might deactivate its associated databus voter and reassociate itself, and its associated lane command processor with another, activated databus voter.

It is seen, therefore, that the databus voter monitor operates to select those present and past possible command signals, in accordance with the selection algorithm, which could have produced the voted command. If the voted command by an associated databus voter corresponds to one of the databus voter monitor stored signals, the monitor assumes that a valid voted command has been produced and that the databus voter is functioning properly. However, if the voted command does not correspond to one of the possible command signals, in accordance with the selection algorithm, a fault condition is detected by the databus voter monitor which can then operate to deactivate the associated databus voter and create an association with another, active databus voter.

In summary, an improved voter for selecting one of several redundant, asynchronous command signals from parallel processors has been described in detail. While a preferred embodiment of the invention has been described in detail, it should be understood that many modifications and variations thereto are possible, all of which fall within the true spirit and scope of the invention.

I claim:

1. In an aircraft fly-by-wire control system wherein each of a plurality of redundant, asynchronous primary flight computers produces flight command signals and wherein at least one control surface of the aircraft is controlled by a plurality of actuators, a processing system for controlling the flight command signals which are passed to the actuators, said processing system comprising:

a plurality of voter means, each voter means associated with a primary flight computer and one or more actuators, for receiving the flight command signals from all primary flight computers, and including selection means for acting in accordance with a predetermined selection algorithm, to pass a selected one of said flight command signals to said associated actuator, such that all actuators for the control surface receive approximately the same flight command signal.

2. In the aircraft fly-by-wire control system of claim 1 having at least three primary flight computers, said processing system further comprising:

said plurality of voter means comprising at least three voter means, each voter means receiving the flight command signals from all three primary flight computers and wherein the selection means further comprises means for:

a) determining if a received flight command signal is from said associated primary flight computer and, in response thereto, b) determining if flight command signals have been received from the other two primary flight computers and, in response thereto, c) selecting the mid value one of the flight command signals to pass to said associated actuator.

3. The processing means of claim 2 wherein the selection means further comprises means for:

i) determining if a received flight command signal is from other than said associated primary flight computer and, in response thereto, d) storing said flight command signal.

4. The processing means of claim 3 wherein the selection means further comprises means for:

i) determining if flight command signals have been received from only one of the other primary flight computers and, responsive thereto, e) selecting the midvalue one of:

i) the flight command signal from said associated primary flight computer, ii) said received flight command signal from the other primary flight computer, and iii) the stored value of a previously voted command.

5. The processing means of claim 4 wherein item b) of the selection means further comprises means for:

ii) determining if flight command signals have been received from neither of the other primary flight computers and, responsive thereto f) selecting said flight command signals from the associated primary flight computer.

6. The processing means of any one of claims 1 through 5 further comprising:

a plurality of voter monitor means, each voter monitor means associated with one of said voter means, said voter monitor means including means for monitoring the flight command signals produced by the primary flight computer and the selected flight command signal by said associated voter means and producing a fault signal if the selected flight command signal by said associated voter means is not consistent with said selection algorithm.

7. The processing means of claim 6 further comprising means responsive to a voter monitor means produced fault signal to deactivate said associated voter means.

8. The processing means of claim 7 further comprising means responsive to a voter means being deactivated to associate the primary flight computer and voter monitor means with a different, activated voter means.

9. The processing means of claim 6 wherein said voter monitor means includes means for comparing said selected flight command signal with both current and past values of the primary flight computer produced flight command signals.

10. In an aircraft fly-by-wire control system wherein each of a plurality of redundant, asynchronous primary flight computers produces flight command signals and wherein at least one control surface of the aircraft is controlled by a plurality of actuators, a method for controlling the flight command signals which are passed to the actuators, said method comprising the steps of:
   a) providing a plurality of voter means, each voter means associated with a primary flight computer and one or more actuators, said voter means performing the steps of:
      i) receiving the flight command signals from said primary flight computers,
      ii) processing said received flight command signals through a predetermined selection algorithm and, in accordance therewith
      iii) passing a selected one of said flight command signals to said associated actuator,
   such that all actuators for the control surface receive approximately the same flight command signal.

11. The method of claim 10 wherein the step of processing the flight command signals through a predetermined selection algorithm further comprises the steps of:
   a) determining if a received flight command signal is from an associated primary flight computer and, in response thereto,
   b) determining if flight command signals have been received from the other two primary flight computers and, in response thereto,
   c) selecting the midvalue one of the flight command signals to pass to said associated actuator.

12. The method of claim 11 wherein the step of determining if a received flight command signal is from said associated primary flight computer further comprises the steps of:
   i) determining if a received flight command signal is from other than said associated primary flight computer and, in response thereto, performing the additional step of
   d) storing said flight command signal.

13. The method of claim 12 including the further steps of:
   e) determining if flight command signals have been received from only one of the other primary flight computers, and, in response thereto, performing the additional step of
   f) selecting the midvalue one of:
      i) the flight command signal from said associated primary flight computer,
      ii) said received flight command signal from said other primary flight computer, and
      iii) the stored value of a previous voted command.

14. The method of claim 13 including the further step of:
   g) determining if flight command signals have been received from neither of the other primary flight computers and, responsive thereto performing the additional step of
   h) selecting said flight command signals from the associated primary flight computer.

15. The method of any one of claims 10–14 including the additional step of: providing a plurality of voter monitor means, each voter monitor means associated with one of said voter means, said voter monitor means performing the steps of:
   a) monitoring the flight command signals produced by the primary flight computers and the selected flight command signal by said associated voter means and
   b) producing a fault signal in response to the flight command signal selected by said associated voter means being inconsistent with said selection algorithm.

16. The method of claim 15 further comprising the step of responding to a voter command means produced fault signal to deactivate said associated voter means.

17. The method of claim 16 further including the step of associating the primary flight computer and the voter monitor means with a different activated voter means responsive to the previously associated voter means being deactivated.

18. The method of claim 15 including the further step of storing previously produced primary flight computer flight command signals and comparing the selected flight command signal by the associated voter means with both current and previous flight command signals.

19. The method of claim 17 including the further step of storing previously produced primary flight computer flight command signals and comparing the selected flight command signal by the associated voter means with both current and previous flight command signals.

* * * * *